July 9, 1935.  A. H. BRÜGGER  2,007,705
CENTERING AND CLAMPING DEVICE ADAPTED FOR SPOOLS
AND SPINDLES IN THE TEXTILE INDUSTRY
Filed July 11, 1934   2 Sheets-Sheet 1

INVENTOR
ALBERT H. BRUEGGER
BY
ATTORNEYS

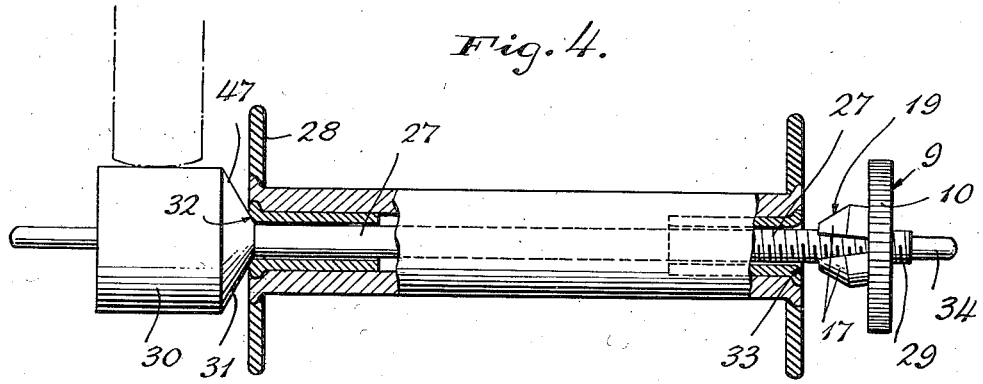
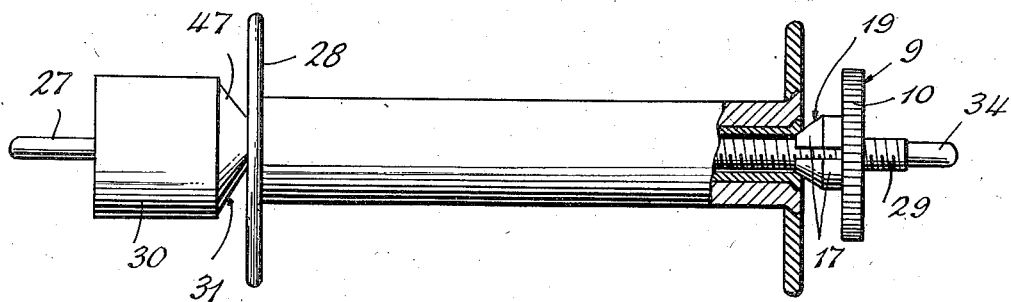
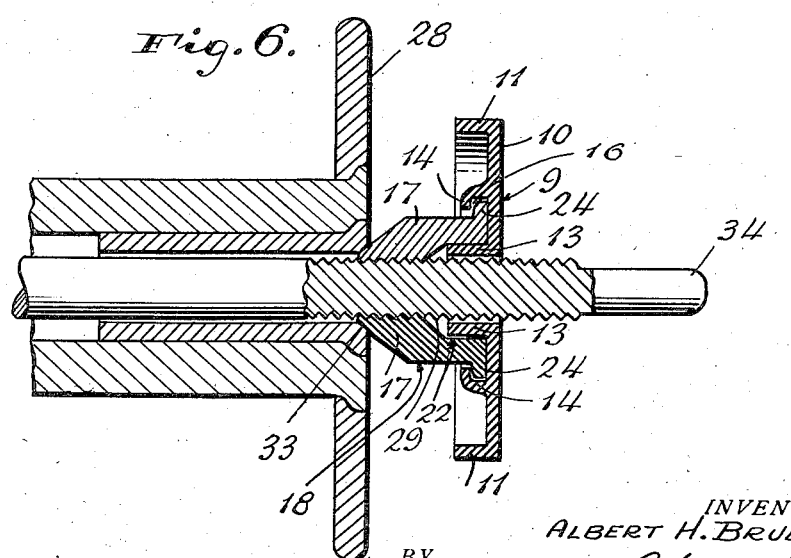

Patented July 9, 1935

2,007,705

UNITED STATES PATENT OFFICE 2,007,705

CENTERING AND CLAMPING DEVICE ADAPTED FOR SPOOLS AND SPINDLES IN THE TEXTILE INDUSTRY

Albert Henry Brügger, Philadelphia, Pa.

Application July 11, 1934, Serial No. 734,625
In France February 3, 1934

5 Claims. (Cl. 242—46.2)

This invention relates to centering and clamping devices and refers more particularly to means for connecting in connection with textile machinery spools and spindles and for holding such spools perfectly centered upon their shafts, spindles or axes.

An object of the present invention is the provision of simple and easily operable means for centering a bobbin, swift, spool or similar rotary element upon its shaft or spindle, and for firmly connecting the spool to its spindle.

Heretofore, spools were connected with their spindles by a number of flat springs which did not hold the spools perfectly centered and which became worn, weakened and even broken when continuously used. These springs must be replaced at regular intervals and often cause an irregular winding which has a particularly detrimental effect on fine rayon and silk yarns.

Another object of this invention is the provision of a springless spindle in combination with means for rapidly and automatically centering a spool and for holding the spool firmly upon the spindle.

The above and other objects of this invention may be realized through the provision of a clamp nut comprising a disc carrying a number of arcuate jaws provided with interior screw threads and having conical exterior end surfaces; the jaws are mounted with a certain amount of play upon the disc, so that they can open and close and their conical end surfaces are adapted to come in contact with the edges of a spool or other rotary element, mounted upon a spindle or shaft having a threaded portion. An intermediate support may be provided between the clamp nut and the spool. The pressure of the clamp nut against the spool or the support causes a closing of the jaws, so that their screw threads engage the screw threads of the spindle. Then a slight turning of the disc will be sufficient to clamp the spool upon its spindle. At the same time, the spool is centered by means of the conical end surfaces of the jaws.

The invention will appear more clearly from the following detailed description when taken in connection with the accompanying drawings showing preferred embodiments of the inventive idea.

In the drawings:

Figures 4 and 5 illustrate the method of centering and clamping a spool upon a springless spindle by means of a clamp nut shown in Figures 1 and 2.

Figure 6 is a sectional view showing a part of the spool attached to its spindle by means of a clamp nut.

Figure 1:
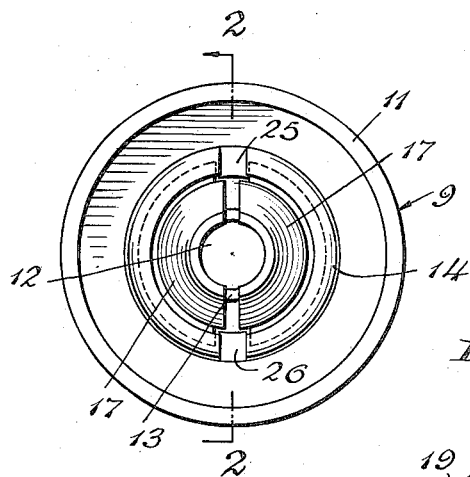
Figure 1 shows a clamp nut in front elevation.
Figure 2:
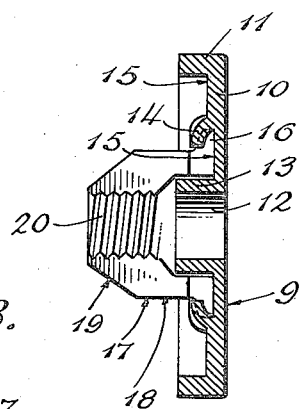
Figure 2 is a section along the line 2—2 of Figure 1.

The centering and clamping device constructed in accordance with the principles of the present invention comprises a clamp nut 9 shown on a larger scale in Figures 1, 2 and 6 of the drawings. The clamp nut 9 is provided with a support or disc 10 having an outer annular end flange 11. The disc or plate 10 has a central opening 12 and is provided with an inner cylindrical flange 13 surrounding the opening 12. Another intermediate circular flange 14 is formed on the surfaces 15 of the disc 10, and is situated between the flanges 11 and 13. As shown more clearly on Figure 2 of the drawings the flange 14 is bent over a portion of the surface 15 so that the flange 14 and an adjacent part of the surface 15 form an annular groove or a pocket 16.

The disc 10 carries a number of jaws 17. In the example illustrated, the disc 10 is provided with two jaws 17, although, obviously, any suitable number of jaws may be used.

Figure 3:
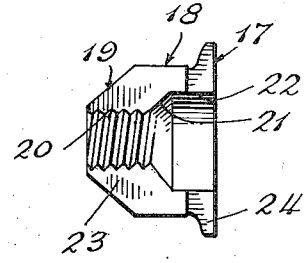
Figure 3 shows one of the jaws of the clamp nut in side elevation.

As shown more clearly in Figure 3 of the drawings, each of the jaws 17 comprises an outer cylindrical surface 18 and an outer conical end surface 19. Each jaw 17 also has a conical inner surface 21 and a cylindrical inner surface 22, and is provided with inner screw threads 20. The outer end 23 of each jaw 17 is tapered, while the opposite inner end of the jaw has the form of a flange 24, which may be inserted into the groove or pocket 16 and is placed between the flanges 13 and 14 of the disc 10.

As shown in Figure 1 of the drawings, the annular groove 16 is divided by projections 25 and 26 which are situated symmetrically around the opening 12 in the groove 16 and which prevent the jaws 17 from swinging around the central opening 12 and from coming too close to each other. The dimensions of the jaws 17 and of the projections 25 and 26 should be such that each jaw 17 may be moved to a certain extent within the groove 16 between a pair of projections 25 and 26.

As shown more clearly in Figures 4 and 6 of the drawings, the cross-sectional area of the groove 16 is greater than that of the flange 24. Furthermore, the outer diameter of the flange 13 is smaller than the diameter of the cylindrical surface 22, and the diameter of the cylindrical surface 18 is smaller than the smallest diameter of the flange 14. Due to this arrangement the jaws 17 are carried with a certain amount of play by the disc 10, so that they may tilt backwards and forwards when the clamp nut 9 is placed upon a spindle 27, or when it is removed from the spindle (Fig. 4).

As shown in Figures 4, 5 and 6 of the drawings, the spindle 27 carrying a spool 28, comprises a threaded portion 29 having screw threads which correspond to the inner screw threads 20 of the jaws 17. The spindle 27 carries a friction boss 30 provided with a support 47 having a conical surface 31. In the example illustrated, the conical support 47 is integral with the friction boss 30. The friction boss 30 may be either cast of one piece with the spindle 27 or it may be cast separately, and then rigidly connected with the spindle 27.

The method of centering the spool 28 upon the spindle 27 and of firmly connecting the spool with the spindle is illustrated in Figs. 4 and 5 of the drawings.

The spool 28 is first mounted loosely upon the spindle 27 and is moved to the left (looking in the direction of Figures 4 and 5) until the conical surface 31 of the member 47 is brought in contact with the conical surface 32 of the spool. Then the clamp nut 9 is mounted upon the end 34 of the spindle 27. Since the jaws 17 are loosely mounted upon the plate 10 these jaws will open somewhat to receive the end 34 of the spindle 27. In the position shown in Figure 4, the jaws 17 surround the spindle 27 and are somewhat spread apart by the spindle.

The clamp nut 9 is moved toward the spool 28 and the conical surfaces 19 of the jaws 17 are pressed against the conical surfaces 33 of the spool 28. Then the spool 28 is also pressed by the clamp nut 9 against the friction boss 30. Due to this pressure the jaws 17 will close and their screw threads 20 will engage the threaded portion 29 of the spindle 27. Then half a turn of the disc 10 will be sufficient to cause a clamping of the jaws 17 around the spindle 27.

In this position the clamp nut 9 is firmly attached to the spindle 27. The bobbin 28 is held tightly between the friction boss 30 and the clamp nut 9 so that it will rotate along with the spindle 27.

To remove the spool 28 it merely is necessary to turn the clamp nut 9 in the opposite direction and then to pull the clamp nut 9 and the bobbin 28 off the end 34 of the spindle 27.

In the position shown in Figures 5 and 6, the central axis of the spool 28 coincides exactly with the central axis of the spindle 27. The centering of the spool 28 is facilitated through the provision of conical surfaces 32 and 33, which cooperate with the conical surface 31 of the friction boss 30 and the conical surfaces 19 of the jaws 17. Obviously, the apexes of all these conical surfaces should be upon the central axis of the spindle 27.

Figure 7:
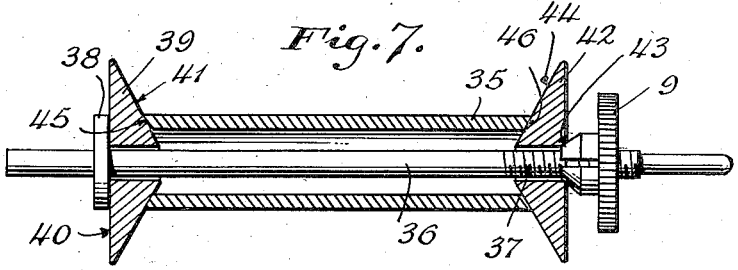
Figure 7 shows a device for centering and clamping a cylindrical tubular element upon its shaft or spindle.

Figure 7 illustrates a device for centering and clamping a tube 35 upon a spindle 36 having a threaded portion 37.

The cylindrical spindle 36 carries a disc or a friction boss 38 which is rotatable along with the spindle. A conical support 39 carried by the spindle 36 is provided with a flat surface 40 which is pressed against the adjacent surface of the friction boss 38, and a conical surface 41. Another conical support 42 which is also carried by the spindle 37, is provided with an inner conical surface 43 and an outer conical surface 44.

The hollow tube 35, which is provided with conical surfaces 45 and 46 is placed between the two supports 39 and 42, and is carried by these supports. The clamp nut 9 carried by the spindle 36 presses the support 42 against the tube 35 and establishes a permanent clamping connection between the spindle 36, the supports 39 and 42 and the tube 35.

Figure 8:
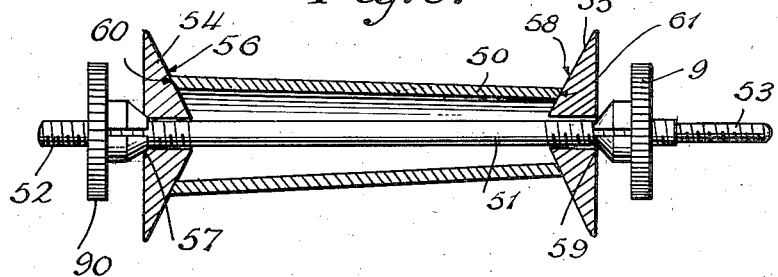
Figure 8 shows a device for centering and clamping a conical hollow element upon its shaft or spindle.

The device shown in Fig. 8 of the drawings is used for centering and clamping a conical hollow tube 50 upon a spindle 51, provided with two threaded ends 52 and 53. The screw threads 52 may be used for connecting the spindle 51 to a separate support, not shown in the drawings. The spindle 51 carries two supports 54 and 55. The support 54 has an outer conical surface 56 and an inner conical surface 57. The support 55 has an outer conical surface 58 and an inner conical surface 59. The tube 50 is provided with conical surfaces 60 and 61, which are brought in contact with the surfaces 56 and 58, respectively.

The tube 50 is held firmly upon the spindle 51 between the two supports 54 and 55 by means of a pair of clamp nuts 9 and 90 which are mounted on both ends 52 and 53 of the spindle 51.

What is claimed is:

1. A centering and clamping device comprising in combination with a spindle having a threaded portion a rotary member mounted upon said spindle and a support mounted upon said spindle and carrying one end of said rotary member; a clamp nut comprising a disc and a plurality of arcuate jaws movably mounted upon said disc, each of said jaws having inner screw threads engaging the threaded portion of said spindle and also having an outer conical end surface engaging said support.

2. A centering and clamping device comprising in combination with a spindle having two threaded end portions and a rotary member mounted upon said spindle; a pair of clamp nuts carried by the two threaded end portions of said spindle and clamping said rotary member, each of said clamp nuts comprising a disc and a plurality of arcuate jaws movably mounted upon said disc, each of said jaws having inner screw threads engaging a threaded portion of said spindle and also having an outer conical end surface.

3. In textile machinery, a spool device including a spool element having a central elongated tubular member to receive the yarn or thread, and transverse end portions to hold the yarn or thread on said tubular member and a spindle element having a longitudinal axial member passing through said tubular member and provided with abutment members to contact with and be clamped against the ends of said spool element and to center said spool element upon said spindle element, at least one of said abutment members having an adjustable centering connection to a threaded portion of said spindle, said last-mentioned abutment element including a disc and a plurality of arcuate jaws movably mounted upon said disc, each of said jaws having inner screw threads to engage the threaded portion of said spindle and also having an outer conical end surface adapted to come in contact with the central opening in the end of said spool element, which contact will press said jaws inwardly, whereby said inner threads engage the threaded portion of said spindle.

4. In textile machinery, a spool device including a spool element having a central elongated tubular member to receive the yarn or thread, and transverse end portions to hold the yarn or thread on said tubular member and a spindle element having a longitudinal axial member passing through said tubular member and provided with abutment members to contact with and be clamped against the ends of said spool element and to center said spool element upon said spindle element, at least one of said abutment members having an adjustable centering connection to a threaded portion of said spindle, said last-mentioned abutment element including a disc and two semi-circular jaws pivotally mounted upon said disc, each of said jaws having inner screw threads adapted to engage the threaded portion of said spindle and also having an outer conical end surface adapted to come in contact with the central opening of said spool element.

5. In textile machinery, a spool device including a spool element having a central elongated tubular member to receive the yarn or thread, and transverse end portions to hold the yarn or thread on said tubular member and a spindle element having a longitudinal axial member passing through said tubular member and provided with abutment members to contact with and be clamped against the ends of said spool element and to center said spool element upon said spindle element, both of said abutment members having conical end portions which will fit into the central opening in the ends of said spool element and one of said members being provided with a threaded connection to said spindle element, and the conical end portion of one of said members being split to enable it to be readily moved along said spindle up to clamping position.

ALBERT HENRY BRÜGGER.